(12) United States Patent
Dagenbach et al.

(10) Patent No.: US 9,434,141 B2
(45) Date of Patent: Sep. 6, 2016

(54) DEVICES FOR PRODUCING A TAPE PRODUCT HAVING DIAGNOSTIC AIDS

(71) Applicant: Roche Diabetes Care, Inc., Indianapolis, IN (US)

(72) Inventors: Ralf Dagenbach, Schwetzinger (DE); Daniel Aigl, Edingen-Neckarhausen (DE); Wolfgang Ditscher, Kaiserslautern (DE); Peter Stubenbord, Neuhofen (DE); Ronald Hofstadt, Boehl-Iggelheim (DE); Andreas Krontal, Heidelberg (DE); Stefan Link, Bensheim-Schwanheim (DE); Klaus Lurg, Buerstadt (DE); Stefan Pflaesterer, Weinheim (DE); Andreas Trapp, Lampertheim (DE); Eric Voelschow, Mannheim (DE); Peter Vetter, Ludwigshafen (DE); Ulf Sprung, Holzmaden (DE)

(73) Assignee: Roche Diabetes Care, Inc., Indianapolis, IN (US)

( * ) Notice: Subject to any disclaimer, the term of this patent is extended or adjusted under 35 U.S.C. 154(b) by 0 days.

(21) Appl. No.: 14/508,085

(22) Filed: Oct. 7, 2014

(65) Prior Publication Data

US 2015/0027639 A1  Jan. 29, 2015

Related U.S. Application Data

(60) Division of application No. 12/770,441, filed on Apr. 29, 2010, now Pat. No. 8,882,951, which is a continuation of application No. PCT/EP2008/064614, filed on Oct. 28, 2008.

(30) Foreign Application Priority Data

Oct. 29, 2007  (EP) ..................................... 07119459

(51) Int. Cl.
*B65H 16/00* (2006.01)
*B65H 18/00* (2006.01)
(Continued)

(52) U.S. Cl.
CPC ........... *B32B 37/0053* (2013.01); *B31D 1/021* (2013.01); *B32B 38/0004* (2013.01);
(Continued)

(58) Field of Classification Search
CPC ........ B65H 7/00; B65H 16/00; B65H 16/02; B65H 16/021; B65H 16/023; B65H 16/025; B65H 16/026; B65H 16/028; B65H 16/08; B65H 18/00; B65H 18/08; B65H 18/085; B65H 18/10; B65H 18/103; B65H 18/12; B65H 18/14; B65H 18/28; B65H 20/00; B65H 20/12; B65H 20/26; B65H 26/00; B65H 26/02; B65H 26/025; B65H 26/04; B65H 26/06; B65H 26/063; B65H 26/066; B65H 26/08; B65H 29/00; B65H 29/12; B65H 35/00; B65H 35/0006; B65H 35/0013; B65H 35/006; B65H 35/04; B65H 35/06; B65H 35/08; B65H 37/00; B65H 37/002; B65H 37/02; B65H 37/04
See application file for complete search history.

(56) References Cited

U.S. PATENT DOCUMENTS 3,235,443 A    2/1966  Cvacho
4,125,757 A *  11/1978 Ross ........................ 219/121.67
(Continued)

FOREIGN PATENT DOCUMENTS

CA   2311496 A1  5/2000
DE   10332488 A1  2/2005
(Continued)

OTHER PUBLICATIONS

International Search Report from Corresponding PCT/EP2008/064614.
(Continued)

*Primary Examiner* — Michael N Orlando
*Assistant Examiner* — Matthew Hoover
(74) *Attorney, Agent, or Firm* — Quarles & Brody, LLP

(57) ABSTRACT

A method for producing an analysis tape for fluid samples, in particular body fluids, is proposed. The method comprises providing a laminate tape having a laminate carrier tape and at least one diagnostic functional layer, and cutting the laminate tape in such a way that a diagnostic auxiliary label arises; transferring the diagnostic auxiliary label to a vacuum roller; and transferring the diagnostic auxiliary label to a carrier tape. In general, at least one vacuum roller is used for the transfer of the diagnostic auxiliary label to the carrier tape. The cutting of the diagnostic functional layer is effected in such a way that a free end of the diagnostic functional layer is lifted off from the laminate carrier tape by guiding the laminate carrier tape around a cutting edge with a small radius, wherein the diagnostic functional layer is cut at a predetermined distance from the lifted off free end by means of a cutting device.

12 Claims, 10 Drawing Sheets

(51) Int. Cl.
*B65H 20/00* (2006.01)
*B65H 26/00* (2006.01)
*B65H 29/00* (2006.01)
*B65H 35/00* (2006.01)
*B65H 37/00* (2006.01)
*B32B 37/00* (2006.01)
*B31D 1/02* (2006.01)
*B65C 9/18* (2006.01)
*B32B 38/00* (2006.01)
*B32B 38/18* (2006.01)
*B32B 39/00* (2006.01)
*B32B 41/00* (2006.01)

(52) U.S. Cl.
CPC ........... *B32B38/0008* (2013.01); *B32B 38/18* (2013.01); *B32B 38/1858* (2013.01); *B32B 39/00* (2013.01); *B32B 41/00* (2013.01); *B65C 9/188* (2013.01); *B32B 2041/04* (2013.01); *B32B 2310/025* (2013.01); *B32B 2310/0843* (2013.01); *B32B 2535/00* (2013.01); *Y10T 156/10* (2015.01); *Y10T 156/12* (2015.01)

(56) References Cited

U.S. PATENT DOCUMENTS

| | | | |
|---|---|---|---|
| 4,442,836 A | 4/1984 | Meinecke et al. | |
| 5,554,166 A | 9/1996 | Lange et al. | |
| 5,846,838 A | 12/1998 | Chandler | |
| 6,036,919 A | 3/2000 | Thym et al. | |
| 6,206,071 B1 * | 3/2001 | Majkrzak et al. | 156/519 |
| 6,207,000 B1 | 3/2001 | Schwoebel et al. | |
| 6,592,693 B1 | 7/2003 | Nedblake | |
| 6,732,013 B2 * | 5/2004 | Alberts | 700/226 |
| 2003/0111184 A1 | 6/2003 | Hilt et al. | |
| 2006/0002816 A1 | 1/2006 | Zimmer et al. | |
| 2006/0173380 A1 | 8/2006 | Hoenes et al. | |
| 2006/0216817 A1 | 9/2006 | Hoenes et al. | |
| 2006/0240568 A1 | 10/2006 | Petruno et al. | |
| 2007/0219572 A1 | 9/2007 | Deck et al. | |
| 2007/0256793 A1 | 11/2007 | Lawson | |
| 2008/0029221 A1 * | 2/2008 | Dangami et al. | 156/379 |

FOREIGN PATENT DOCUMENTS

| | | |
|---|---|---|
| DE | 10343896 A1 | 4/2005 |
| EP | 1424040 A1 | 6/2004 |
| EP | 0949002 B1 | 3/2005 |
| EP | 1837170 A1 | 9/2007 |
| EP | 1593434 B1 | 7/2008 |
| EP | 1992284 A1 | 11/2008 |
| WO | 97/02487 A1 | 1/1997 |
| WO | 98/48695 A1 | 11/1998 |
| WO | 99/03738 A1 | 1/1999 |
| WO | 2004/056269 A1 | 7/2004 |
| WO | 2005/107596 A2 | 11/2005 |
| WO | 2006/013045 A1 | 2/2006 |

OTHER PUBLICATIONS

International Preliminary Report on Patentability from Corresponding PCT/EP2008/064614.

* cited by examiner

DEVICES FOR PRODUCING A TAPE PRODUCT HAVING DIAGNOSTIC AIDS

CLAIM OF PRIORITY

This patent application is a divisional of U.S. patent application Ser. No. 12/770,441 (filed Apr. 29, 2010), which is a continuation based on and claiming priority to Int'l Patent Application No. PCT/EP2008/064614 (filed Oct. 28, 2008), which claims the priority benefit of EP Patent Application No. 07119459.1 (filed Oct. 29, 2007). Each patent application is incorporated herein by reference as if set forth in its entirety.

TECHNICAL FIELD OF THE INVENTION

The invention relates to a method for producing an analysis tape for fluid samples, in particular body fluids. The invention furthermore relates to a device for producing an analysis tape for fluid samples, in particular using a method according to the invention. Methods and devices of this type are generally used for example to produce a tape product comprising diagnostic aids, for example diagnostic aids for a single use. Diagnostic aids of this type can comprise in particular one or more test fields with a detection chemical and/or lancets for obtaining a fluid sample of a body fluid, such as are used in the context of diabetes diagnostics, for example. Other fields of application are also conceivable, however.

BACKGROUND

The examination of blood samples or other samples of body fluids, such as interstitial fluid, for example, enables, in clinical diagnostics, early and reliable identification of pathological states and targeted and astute monitoring of body states. Medical diagnostics generally presupposes that a sample of blood or interstitial fluid is obtained from the patient to be examined. In order to obtain the sample, the skin of the person to be examined can be perforated, for example at the finger pad or the ear lobe, with the aid of a sterile, pointed or sharp lancet in order thus to obtain a few microliters of blood or less for analysis. In particular, this method is suitable for an analysis of the sample which is carried out directly after the sample has been obtained. Primarily in the field of so-called "home monitoring", that is to say where medical laypersons themselves carry out simple analyses of blood or interstitial fluid, in particular for diabetics obtaining blood samples on a regular basis, several times a day, to monitor the blood glucose concentration, lancets and associated devices (so-called puncturing aids) are offered. These are described for example in WO-A 98/48695, U.S. Pat. Nos. 4,442,836, 5,554,166 or WO 2006/013045 A1.

Self-monitoring of blood sugar levels is a method of diabetes control that is nowadays applied worldwide. Blood sugar devices in the prior art generally have an analysis device into which a test element (for example a test strip) is introduced. The sample to be analyzed is applied to a test field of a test element and reacts in the test field with one or more reagents, if appropriate, before it is analyzed. Optical, in particular photometric, and electrochemical evaluation of test elements are the most common methods for rapidly determining the concentration of analytes in samples. Analysis systems comprising test elements for sample analysis are generally used in the field of analysis, environmental analysis, and primarily in the field of medical diagnostics. Test elements which are evaluated photometrically or electrochemically are of great significance particularly in the field of blood glucose diagnostics from capillary blood.

The prior art discloses various forms of test elements and test devices for the evaluation thereof. By way of example, strip-type test elements can be used, such as are described for example in the documents CA 2311496 A1, U.S. Pat. Nos. 5,846,838 A, 6,036,919 A or WO 97/02487. Further multilayered test elements known in the prior art are analysis tapes comprising a multiplicity of test fields which are provided in a cassette in a manner wound up for use in an analysis device. Such cassettes and analysis tapes are described for example in the documents DE 10 332 488 A1, DE 10 343 896 A1, EP 1 424 040 A1, WO 2004/056269 A1 and US 2006/0002816 A1. Besides analysis tapes comprising test fields, analysis tapes in which lancets are arranged on a carrier tape have also become known in the meantime, wherein the individual lancets, by means of tape transport, can be progressively used and also disposed of again. One example of a system of this type is shown in WO-A 2005/107596. Hereinafter, therefore, an "analysis tape" is understood to mean a tape with any desired type of diagnostic aids, wherein the diagnostic aids can comprise any desired type of diagnostic aids, for example diagnostic test fields with a detection chemical and/or lancets.

Various methods are known for producing the analysis tapes. These methods have to satisfy numerous stringent requirements since, in the field of medical diagnostics, stringent requirements are made for example of freedom from contamination for the analysis tapes, and also stringent requirements are made of the quality and the reproducibility of the diagnostic aids applied on the analysis tapes. At the same time, however, the analysis tapes have to be produced cost-effectively since medical diagnostics is under constantly increasing cost pressure.

EP 1 593 434 A2 discloses a method and a device for producing an analysis tape for fluid samples. In this case, a rollable transport tape is provided with a multiplicity of test fields situated at a distance from one another in the direction of the tape for analyzing the fluid samples, in which case a multilayered test label tape is prefabricated at least from a detection film and an adhesive tape and the test fields are subsequently transferred as self-adhesive test labels from the test label tape to the transport tape. For this purpose, it is proposed that a multitrack label tape is subdivided into multiple test labels in sections by stamping and removing a stamping grid, said multiple test labels subsequently being transferred to the transport tape in a labeling method.

This known method allows cost-effective and precise production of high-quality analysis tapes. It has been found here during use in practice, however, that the analysis method described in EP 1 593 434 A2 is restricted in terms of throughput, such that labeling tolerances which exceed the predetermined maximum tolerances may occur at tape speeds of the carrier tape of tens of m/min.

A further disadvantage of the known labeling methods, such as the method known from EP 1 593 434 A2, for example, is that large amount of rejects arise during labeling. Thus, by way of example, the stamping and removal of the stamping grid as described in EP 1 593 434 A2 are associated with considerable rejects, which, in view of the high quality of the test chemical used and the complex construction of the multitrack label tape used, considerably increases the production costs.

Therefore, it is an object of the present invention to provide a method for producing an analysis tape and also a corresponding device which avoid the disadvantages of known methods and devices. In particular, the method is intended to be suitable for production with a high throughput, good precision and low defect tolerance being achieved even at high throughputs.

SUMMARY

This object and others that will be appreciated by a person of ordinary skill in the art have been achieved according to the embodiments of the present invention disclosed herein, including the features of the independent claims and other features realized individually or in combination, such as may be presented in the dependent patent claims. All of the claims are hereby incorporated in the content of the description.

A method for producing an analysis tape for fluid samples, in particular body fluids, is proposed. The analysis tape is intended to have at least one diagnostic and/or therapeutic function and can comprise in particular at least one diagnostic aid for this purpose. In particular, said diagnostic aid can be a diagnostic test field with a detection chemical designed to detect one or more analytes in the fluid sample. By way of example, the test chemical can change at least one detectable physical and/or chemical property if it comes into contact with the analyte to be detected. In particular, an optically detectable property (for example a color change and/or a change in a fluorescence property) and/or an electrochemically detectable property can be involved.

As an alternative or in addition, the at least one diagnostic aid can furthermore comprise a lancet designed to perforate part of the patient's skin in order to produce a fluid sample. In this case, test fields and detection chemicals known from the prior art (for example in accordance with the prior art described above) and/or lancet types known from the prior art (for example in accordance with the prior art described above) can be used. It is possible to use analysis tapes which comprise exclusively diagnostic test fields and/or exclusively lancets, wherein the test fields and/or lancets can be arranged for example at regular distances on a carrier tape. However, analysis tapes comprising test fields and lancets which are arranged alternately, for example, are also conceivable. In this way, by way of example, by means of the analysis tape, firstly a blood sample or some other sample of a body fluid can be generated using a lancet, after which this fluid sample can be analyzed for example with the assistance of a test field adjacent to the lancet on the carrier tape.

In the method proposed, a laminate tape comprising at least one laminate carrier tape and at least one diagnostic functional layer is used as a semifinished product. The laminate carrier tape, which can comprise for example a paper tape and/or a plastic tape and/or a multilayered carrier tape, serves only as transport means of the actual diagnostic functional layer and can subsequently be disposed of or reused, for example. The diagnostic functional layer is adapted to the type of diagnostic aids to be applied and can comprise for example a multiplicity of lancets and/or at least one detection chemical. In the latter case, the diagnostic functional layer can be configured for example as described in EP 1 593 434 A2 and can comprise for example the test chemical in the form of a detection film. In addition, the diagnostic functional layer can comprise further layers, such as adhesive layers (which can be arranged, for example, between lancet and/or test chemical and the laminate carrier tape), for example, absorbent covering layers (for example spiriting layers) and/or hydrophilizing and/or hydrophobizing impregnations. Further layers, for example sealing layers for lancets or the like, can also be included.

In the present invention, the diagnostic aids can be transferred to the carrier tape in the form of diagnostic auxiliary labels in a roll method, for example in a manner similar to the method described in EP 1 593 434 A2. For this purpose, the at least one diagnostic functional layer of the laminate tape is firstly cut in such a way that a diagnostic auxiliary label arises. This diagnostic auxiliary label can correspond for example to the test labels in EP 1 593 434 A2 and can be for example a self-adhesive auxiliary label.

In contrast to EP 1 593 434 A2, however, the invention proposes improving the transfer of the diagnostic auxiliary labels to the carrier tape by using at least one vacuum roller. In this case, a vacuum roller is understood to mean a roller which (for example through one or more suction openings arranged circumferentially on the roller) can suck up an auxiliary label and transport it from the laminate tape to the carrier tape by rotation of the vacuum roller. In order that the auxiliary labels are subsequently released again and applied to the carrier tape, it is possible to utilize adhesion forces between the auxiliary label and the carrier tape, for example. If self-adhesive auxiliary labels are involved, for example, then said adhesion forces may be greater than the suction forces of the vacuum roller, such that the auxiliary labels are released from the vacuum roller and applied to the carrier tape.

As an alternative or in addition, however, the vacuum roller can also be configured in such a way that, by way of example, in the region of the circumferential segment of the vacuum roller in which the auxiliary labels are applied to the carrier tape, the suction to which the auxiliary labels are subjected is stopped. This can be done for example by interrupting the application of vacuum to the suction openings in said region, or it is even possible to apply excess pressure in a targeted manner in said circumferential region, for example using compressed air.

Vacuum rollers are known from other fields of technology, in which non-medical products are produced. Thus, by way of example, U.S. Pat. No. 6,206,071 B1 describes a device which removes a "liner" from labels and applies said labels to products. A vacuum roller is used in this case. WO 99/03738 also describes vacuum rollers, designated there as transfer cylinders, for use in labeling machines. Therefore, for possible configurations of the vacuum roller in the context of the present invention, reference may be made to these two documents. Other types of configuration of the vacuum rollers are also conceivable, and can be used in the context of the present invention.

It has been found in the context of numerous tests that the concept according to the invention of using at least one vacuum roller for the transfer of the auxiliary labels to the carrier tape affords considerable advantages with regard to the precision with which the auxiliary labels are applied. While conventional labeling methods only enable slow tape speeds, it is possible by means of the method according to the invention to achieve tape speeds in the range of tens of m/min and labeling rates of up to 500 labels/min or more, where tolerances in the sub-millimeter range (for example of at most 0.5 mm) can be achieved. Consequently, by means of the method according to the invention, the throughput is increased, costs are reduced, and at the same time a high quality of the analysis tapes produced is maintained or ensured.

In addition to the method described, a device for producing an analysis tape in accordance with the description above is proposed, which may be suitable in particular for implementing the described method or a method in one of the modifications described below. In this respect, for possible configurations, reference may largely be made to the description above and below, wherein the device can comprise in each case corresponding devices for implementing these individual optional method steps.

The device comprises a labeling device, a laminate drive for supplying the laminate tape to the labeling device, a cutting device for cutting the laminate tape, in particular the diagnostic functional layer of the laminate tape, a vacuum roller and a carrier drive for supplying the carrier tape to the labeling device. The device is designed to transfer the diagnostic auxiliary label cut by the cutting device to the vacuum roller, wherein the carrier drive and the vacuum roller interact in such a way that the diagnostic auxiliary label is transferred from the vacuum roller to the carrier tape. For the advantages of this device by comparison with known devices, reference may largely be made to the description above.

The method described and the device described can be advantageously developed in various ways. Thus, the drives for the laminate carrier tape or the laminate tape (laminate drive), the carrier tape (carrier drive) and the vacuum roller (vacuum roller drive) can be synchronized. This synchronization has brought about in practice a considerable gain in the positioning accuracy of the diagnostic auxiliary labels and thus a significant increase in the tape speeds and the throughput. The synchronization can be effected mechanically and/or electronically, and it is also possible to combine two or more of the stated drives.

Suitable drives include electric motors, for example, in particular powerful servomotors, which achieve the stated accuracies. Thus, it is possible to use three servomotors, for example, which can be driven via a BUS system. A specific high power SPC, for example, can function as installation controller. On account of the high transport speed of the laminate carrier tape and/or of the carrier tape, the reaction times of the SPC controller should be extremely low. Moreover, the reaction time per cycle should always be of identical length in order to be able to achieve an exact synchronization of the drives in the case of variable speeds, since, by way of example, 1 ms switching time at the speed of approximately 55 m/min means a positioning tolerance of 1 mm in the direction of travel.

As an alternative or in addition to synchronization of the drives, the at least one cutting device used for cutting the auxiliary labels can furthermore be synchronized with one or more of the drives. The cutting device can comprise a laser, in particular, for example a CO2 laser, which brings about a particularly high cutting accuracy, a high cutting speed and little cutting waste of the auxiliary labels. Such a cutting device which comprises at least one laser can be synchronized particularly easily since it is merely necessary to switch the laser on and off and/or to block or release the laser beam and/or to deflect the laser beam.

The cutting of the diagnostic functional layer can be effected, in particular, in such a way that a free end of the diagnostic functional layer is lifted off from the laminate carrier tape by guiding the laminate carrier tape around a cutting edge with a small radius (for example a radius of less than 10 mm, in particular less than 5 mm). In this case, the lifted off diagnostic functional layer can then be cut at a predetermined distance from the lifted off free end by means of the cutting device. By way of example, it is possible once again for labels to be cut out or it is possible simply for a section of the lifted off diagnostic functional layer to be completely lifted off. The lifted off free end of the diagnostic functional layer can be applied to the vacuum roller before, during or directly after cutting, such that, after cutting, the cut off auxiliary label is applied completely to the vacuum roller. The cutting can be effected in particular in the region of the cutting edge, for example within an air gap between the cutting edge and the surface of the vacuum roller.

In contrast to known labeling methods, such as the labeling method disclosed in EP 1 593 434 A2, for example, the cutting in the method proposed can be carried out in particular in a manner substantially free of losses. In this case, "in a manner substantially free of losses" should be understood to mean a process of cutting in which, apart from the cutting waste resulting from the cutting device (which may typically be in the range of approximately 1/10 mm), no waste arises which, as described in EP 1 593 434 A2, would have to be segregated. Therefore, from its free end, the diagnostic functional layer in one embodiment is completely cut up into auxiliary labels by cutting off an auxiliary label from said lifted off diagnostic functional layer, generally at a predetermined distance from said lifted off free end, and transferring to the vacuum roller. This means a considerable advantage over conventional labeling methods, such as not only the method described in EP 1 593 434 A2, but also for example the labeling methods in accordance with U.S. Pat. No. 6,206,071 B1 or other known labeling devices, not only since the segregation in practice can cause considerable technical outlay but since now the cost intensive diagnostic functional layer can be completely utilized.

Further advantageous configurations concern the tape guidance of the laminate tape or laminate carrier tape and/or of the carrier tape. Thus, for better guidance by means of the drives mentioned, the laminate carrier tape and/or the carrier tape can be charged electrostatically, for example, in order to ensure better adhesion for example on one or more rolls of the drives.

In other embodiments, the method and the device are configured in such a way that always in each case one diagnostic auxiliary label is applied simultaneously on the vacuum roller. This simplifies the transfer and increases the positioning accuracy.

A further improvement in the positioning accuracy concerns the configuration of the guidance and the drive of the carrier tape at the location where the diagnostic auxiliary label is transferred, that is to say at the location of the labeling device. Thus, in particular, the carrier tape can be guided in planar fashion at this location, for example using a support on a side opposite to the labeling side of the carrier tape, which has a counterpressure with respect to the vacuum roller. It is possible, however, to provide an application roller at this location where the diagnostic auxiliary label is transferred to the carrier tape, wherein the carrier tape is guided through a roller gap between the application roller and the vacuum roller. In this case, the carrier tape can be guided in planar fashion by means of the application roller, that is to say without significant deflection by the application roller. It is possible, however, for the application roller to be configured in such a way that the carrier tape at least partly follows the circumference of the application roller, that is to say is deflected by said application roller. In this case, the application roller can be a part of the drive of the carrier tape. This development of the invention has the advantage that the drive of the carrier tape is effected directly at the location where the auxiliary labels are applied, such that, by way of example, stretching effects of the carrier tape are only of slight significance. The spatial uniting of drive and application location of the auxiliary labels thus brings about a considerable improvement in the accuracy of the positioning of the auxiliary labels on the carrier tape.

A further advantage of using a vacuum roller for applying the auxiliary labels to the carrier tape consists in the possibility of effecting corrective intervention in the application. This is advantageous in particular since quality assurance is of considerably higher significance in the production of medical products than in the field of conventional labeling machines in which all labels are applied non critically and without consideration of the quality thereof to an article to be labeled.

Thus, in particular, the vacuum roller can be utilized for discharging defective auxiliary labels and/or defective sections of the diagnostic functional layer from the production process. For this purpose, by way of example, the diagnostic functional layer and/or other regions of the laminate tape can be provided with a defect marking that identifies defective sections of the diagnostic functional layer. These defect markings can be applied for example by virtue of the fact that the device described has a defect identification device and/or a marking device. The defect identification device can be configured for example in such a way that the diagnostic functional layer and/or the laminate tape can be examined for defects optically and/or electrically and/or in some other way. By way of example, it is possible in this way to identify a discoloration of a test chemical and/or an incorrect positioning of lancets on the laminate tape. The defect marking device can be used to correspondingly mark the laminate tape and/or the diagnostic functional layer if defects of this type are identified. Thus, by way of example, defect markings can be printed onto the laminate tape and/or the diagnostic functional layer and/or a differently designed marking of the defects can be effected. By way of example, it is possible to use a test chemical itself by the action of a marking beam, for example of a light beam (e.g. in the visible and/or ultraviolet spectral range). In this way, by way of example, defective sections of the generally light-sensitive test chemical can be colored in order in this way to identify these sections as defective.

The device can furthermore have a detection device in the region of the labeling device (that is to say for example in direct proximity to the vacuum roller), said detection device identifying the defect marking. By way of example, said detection device can be an optical and/or electrical detection device, which is specifically adapted to the defect markings and thus identifies printed-on defect markings and/or discolored regions in the test chemical, for example.

The vacuum roller used permits particularly simple discharge of such defective sections of the diagnostic functional layer. Thus, sections which have been identified as defective before or after application to the vacuum roller can be removed and disposed of, for example. For this removal of defective sections, the device can have a withdrawal device, for example, where various devices can be used as withdrawal device. Thus, it is possible to effect the removal of the defective sections from the vacuum roller for example electrostatically, mechanically or in some other way. It is possible for an extraction device using suction to be used, which is utilized for removing the defective sections and which is triggered by the detection device, for example, as soon as a section identified as defective of the diagnostic functional layer is identified. Such extraction by suction can be effected within fractions of a second, such that the production process as a whole need not be influenced, or need be influenced only to an insignificant extent. Moreover, the extraction device using suction affords the advantage that contaminants can also be removed at the same time as or in addition to defective sections of the diagnostic functional layer, with the result that a problem of contamination can be significantly reduced.

As described above, the diagnostic auxiliary labels can comprise one or more diagnostic aids which are applied to the carrier tape at regular distances for example by the method described. It is possible for the diagnostic auxiliary labels each to comprise a plurality of diagnostic aids of this type, such as a plurality of identically designed diagnostic aids. In this way, the method described can be rationalized for example by virtue of the diagnostic functional layer of the laminate tape having a plurality of tracks of diagnostic aids arranged in a parallel fashion in a running direction of the laminate tape, such that, during the process of cutting the diagnostic functional layer, the diagnostic auxiliary label that arises in the process has a plurality of diagnostic aids which are then applied to the carrier tape in an arrangement perpendicular to the carrier tape running direction. The carrier tape can then be cut into a plurality of sub-tapes for example by means of a mechanical or optical cutting process, wherein, by way of example, each of said sub-tapes comprises a diagnostic aid of each diagnostic auxiliary label. Said sub-tapes can subsequently be used as actual analysis tapes. This described method of cutting into a plurality of sub-tapes can be configured for example analogously to the cutting method described in EP 1 593 434 A2.

Furthermore, the method can be developed by virtue of the carrier tape comprising additional markings. These markings can be applied to the carrier tape for example by means of a rotary screen printing method and/or some other printing method or coating method, typically before the auxiliary labels are applied to the carrier tape. Thus, by way of example, positioning marks can be applied on the carrier tape, which positioning marks can be used in the content of the production method for the positioning of the auxiliary labels and/or can be used later for example in an analytical test instrument for a positioning of the diagnostic aids within the instrument.

As an alternative or in addition, the carrier tape can furthermore comprise reference marks for an optical calibration of the analysis tape. In particular, it is possible to apply color markings on the carrier tape, which enable a color balancing. This is advantageous particularly when the analysis tape comprises diagnostic aids which are utilized optically, for example test chemicals which are utilized for an optical analyte detection. Thus, the reference marks can comprise for example white and/or black fields which can be utilized for such a color balancing and/or a calibration of light sources used (for example reflectance measurements).

BRIEF DESCRIPTION OF THE DRAWINGS

The following detailed description of the embodiments of the present invention can be best understood when read in conjunction with the following drawings, where like structure is indicated with like reference numerals and in which.

In order that the present invention may be more readily understood, reference is made to the following detailed descriptions and examples, which are intended to illustrate the present invention, but not limit the scope thereof.

DETAILED DESCRIPTION OF EMBODIMENTS OF THE PRESENT INVENTION

The following descriptions of the embodiments are merely exemplary in nature and are in no way intended to limit the present invention or its application or uses.

Figure 1:
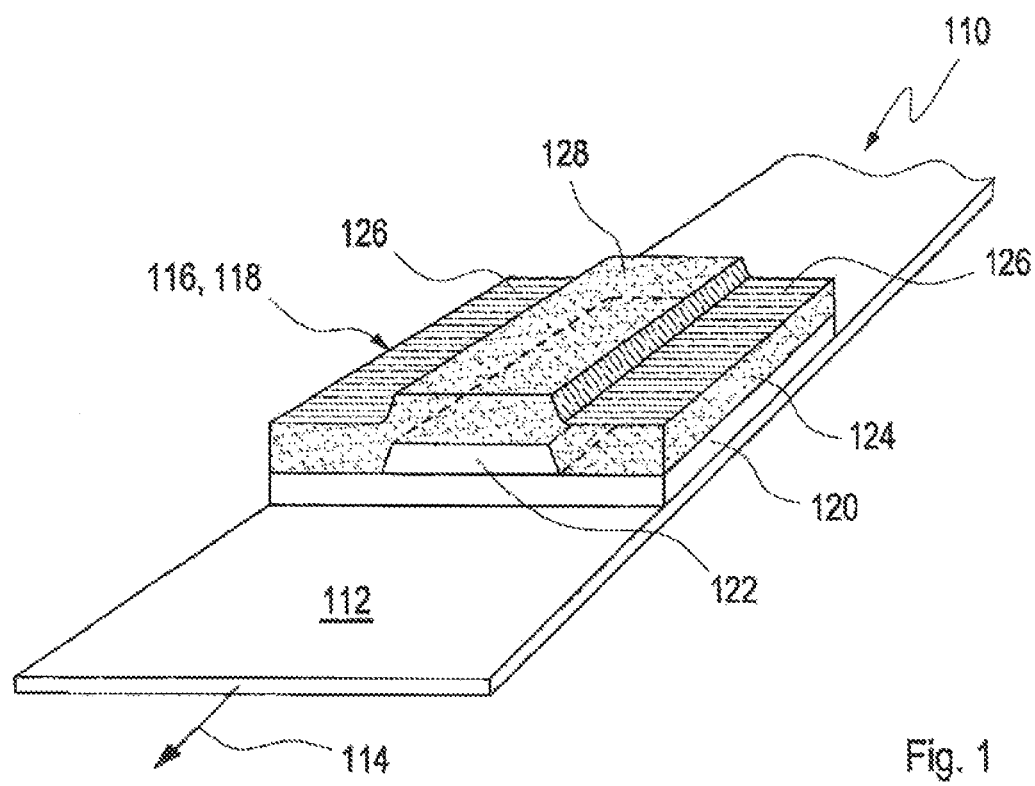
FIG. 1 shows an exemplary embodiment of an analysis tape which can be produced according to a method according to the invention.

FIG. 1 illustrates one possible exemplary embodiment of an analysis tape 110 such as is known from EP 1 593 434 A2, for example, and such as can be produced for example by a method according to the invention described below. The analysis tape 110 comprises a carrier tape 112, which can be configured for example as a carrier film in the form of a plastic film. Said carrier film can be made very thin, for example, with a thickness of between 10 and 15 μm, for example, and can comprise at least one plastic material, for example polyethylene.

A multiplicity of test fields 116 are applied on the carrier tape 112 in a manner spaced apart in a transportation direction 114. Of these test fields 116, which, by way of example, can be arranged at a distance of 110 mm and can have a length in the transport direction 114 of approximately 15 mm, just one is illustrated in FIG. 1. It should be assumed hereinafter that the test fields 116 are configured for detecting an analyte, in particular blood glucose, in body fluids, in particular in blood.

The analysis tape 110 in accordance with the illustration in FIG. 1 can correspond for example to the exemplary embodiment in accordance with EP 1 596 434 A2. In this exemplary embodiment, the test fields 116 form in each case a diagnostic aid 118 and can be embodied in multilayered fashion for example as self-adhesive test labels. They each comprise a section of an optional adhesive tape 120, of a film of a test chemical 122 and of an optional absorbent covering layer 124 in the form of a fabric. Said covering layer 124 serves to enable an applied liquid sample to be distributed uniformly on the test field 116 and is often also designated as "sprite layer". Outside the test chemical 122, said covering layer 124, which may have hydrophilic properties, is provided in regions with an impregnation 126, which may have hydrophobic properties. By way of example, said impregnation 126 can be a printed-on wax layer which leaves free only a central detection zone 128 in the region of the test chemical 122, within which the liquid sample can spread. The test chemical 122 is intended to be configured to change at least one detectable property, for example an optical or electrochemical property, if it comes into contact with the at least one analyte to be detected. Test chemicals of this type are known from the prior art, for example the prior art cited in the introduction.

Figure 2:
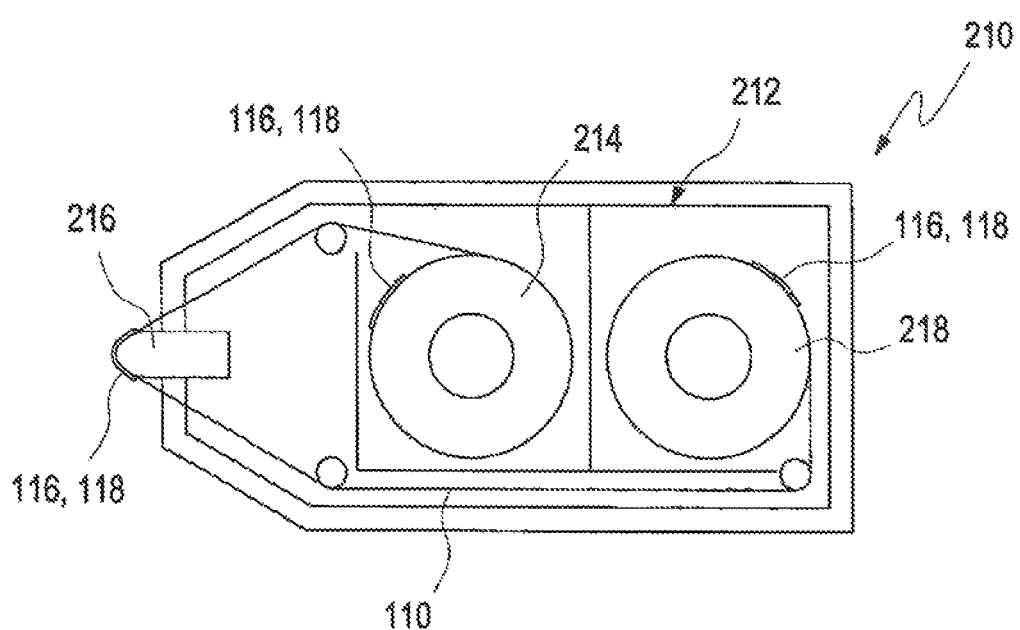
FIG. 2 shows an exemplary embodiment of a blood sugar test device with a tape cassette containing an analysis tape.

FIG. 2 illustrates a blood sugar test device 210, in which the analysis tape 110, accommodated in a tape cassette 212, can be used. In this case, the analysis tape 110 is wound on a good winding 214. By means of a process of winding forward, the individual test fields 116 can be exposed in the region of a measuring head 216 in order to apply a blood sugar drop for the determination of glucose. In this case, fluid is taken up in the central detection zone 128 of the covering layer 124, wherein the edge strips provided with the impregnation 126 delimit the spreading of fluid. On account of the multilayered construction, the test fields 116 have a certain height, while the thin, flexible carrier tape 112 in the intervening regions permits reliable sealing at sealing elements, such that secure magazination protected against ambient influences is possible. After use, the test fields 116 that have been used are wound onto a poor winding 218 by the analysis tape 110 being wound further and are thus securely and hygienically remagazination.

Figure 3:
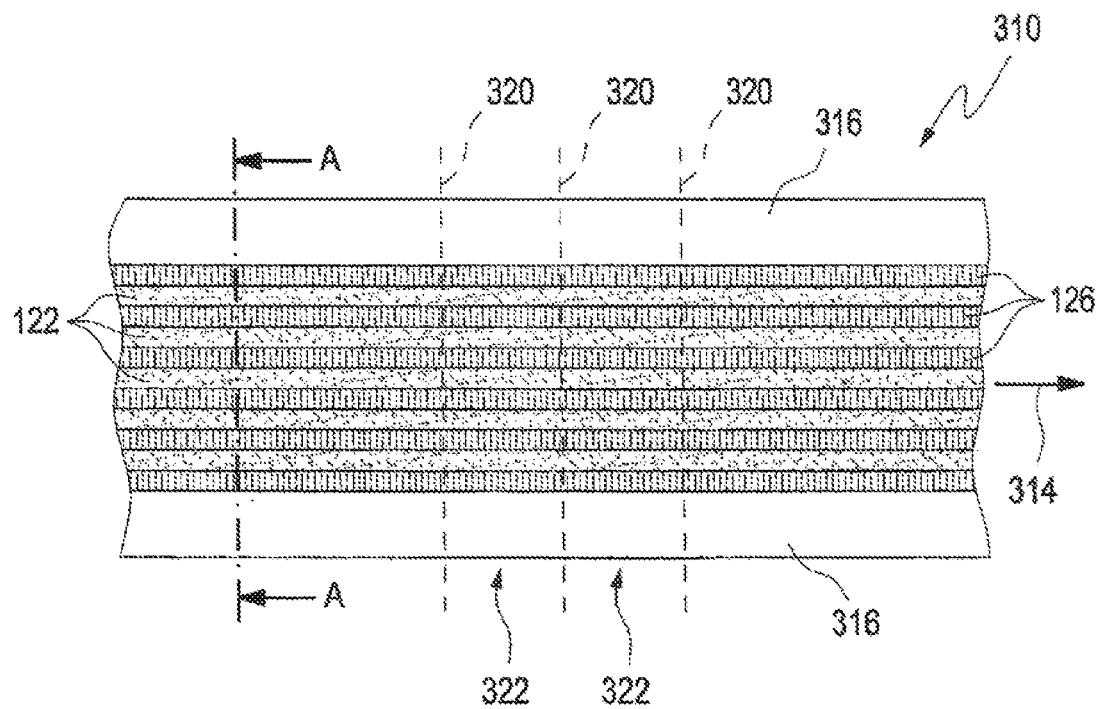
FIG. 3 shows an exemplary embodiment of a laminate tape used in a method according to the invention, in plan view.
Figure 4:
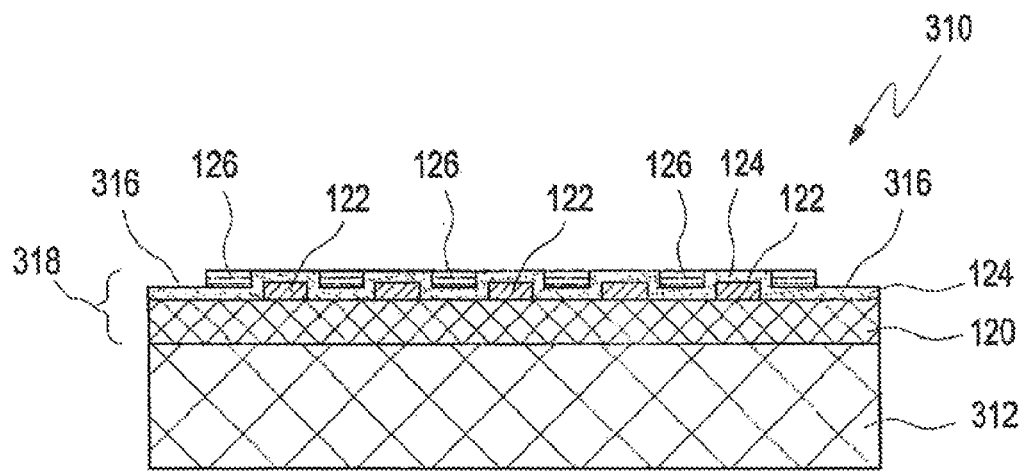
FIG. 4 shows the laminate tape in accordance with FIG. 3 in a sectional illustration.

According to the invention, the production of the analysis tapes 110 is performed by means of a roll-to-roll method, which is explained in greater detail below with reference to FIGS. 9 to 12. Firstly, the carrier tape 114 already described in FIG. 1 is used as a preliminary product for the production of the analysis tape. A laminate tape 310 is used according to the invention as a second preliminary product. By way of example, FIGS. 3 and 4 illustrate such a laminate tape for the production of diagnostic aids 118 with a test chemical 122. In this case, FIG. 3 shows a plan view of the laminate tape 310, whereas FIG. 4 shows a sectional illustration along the sectional line A-A in FIG. 3.

As can be discerned from FIG. 4, the laminate tape has a laminate carrier tape 312. This laminate carrier tape 312 can for example in turn comprise a plastic tape, for example once again a polyethylene film or a similarly designed laminate carrier tape. The adhesive layer 120 is applied to this laminate carrier tape 312, said adhesive layer corresponding to the adhesive layer 120 in FIG. 1 and, during the method according to the invention, being concomitantly transferred from the laminate carrier tape 312 to the carrier tape 112. The test chemical 122 is applied to the adhesive layer in structured tracks, wherein the tracks extend parallel to a running direction 314 of the laminate tape 310. In the present case, these tracks of the test chemical 122 have a width of approximately 2 mm (the illustration in FIGS. 3 and 4 is only schematic and not true to scale) and are arranged equidistantly, with an interspace of likewise approximately 2-3 mm. Overall, five strips of test chemical 122 are provided on the laminate tape 310.

As described above, the test chemical strips 122 are covered with a covering layer 124 of a hydrophilic fabric. This covering is effected in such a way that the covering layer 124 extends over the entire width of the laminate carrier tape 312. As described above, in each case a likewise strip-shaped impregnation 126 is additionally applied to the covering layer 124 outside the test chemical 122, wherein a total of six such strips of the impregnation 126 are applied, which likewise extend in the running direction 314. This application is effected in such a way that edge regions 316 of the laminate tape 310 remain uncovered.

The adhesive layer 120, the test chemical 122, the covering layer 124 and the impregnation 126 together form a diagnostic functional layer 318. In the method described below, this diagnostic functional layer 318 is cut along cutting lines 320 running perpendicularly to the running direction 314, whereas the laminate carrier tape 312 remains uncut. In this way, diagnostic auxiliary labels 322 are formed from the diagnostic functional layer 318 during the cutting process, said diagnostic auxiliary labels being transferred to the carrier tape 112.

Figure 5:
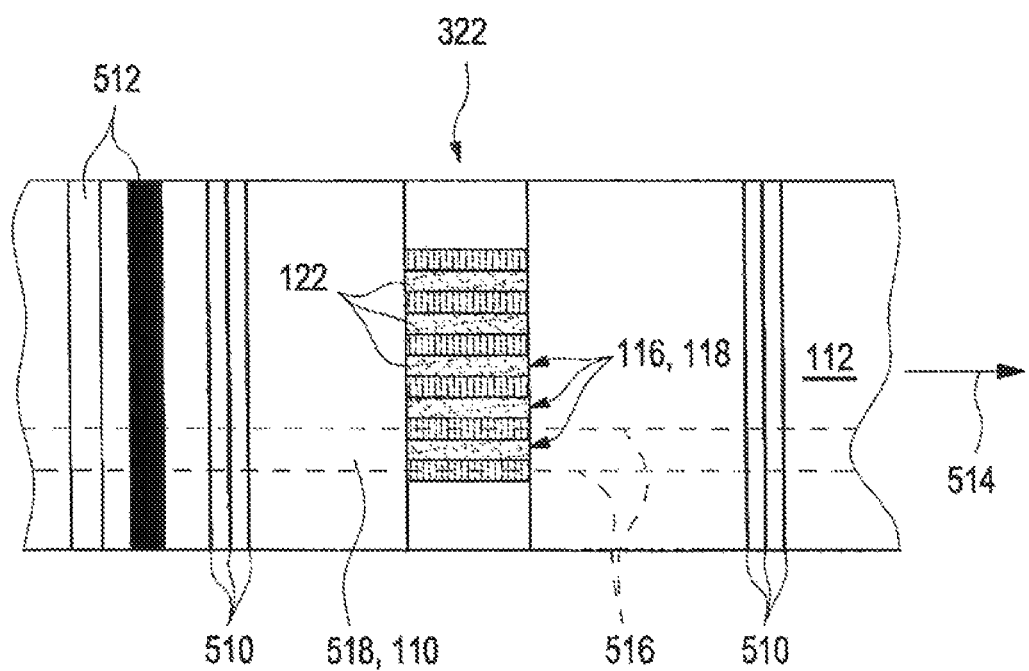
FIG. 5 shows an exemplary embodiment of a carrier tape which can be used in a method according to the invention with an applied diagnostic auxiliary label.

FIG. 5 schematically illustrates such a carrier tape 112 with diagnostic auxiliary labels 322 adhesively bonded thereon. Once again only one diagnostic auxiliary label 322 of this type is shown; other auxiliary labels 322 are arranged equidistantly with respect thereto.

Furthermore, it can be discerned in FIG. 5 that positioning marks 510 are arranged on the carrier tape 112, said positioning marks merely being indicated schematically in FIG. 5. These positioning marks 510 serve for example for the positioning of the test fields 116 in the blood sugar test device 210 in accordance with FIG. 2. Furthermore, these positioning marks can be used in the production method described below. Alongside the positioning marks 510, in the exemplary embodiment illustrated in FIG. 5, the carrier tape 112 comprises in each case reference marks 512, for example in the form respectively of a white and black bar applied perpendicularly to the running direction 514 of the carrier tape 112, which can be utilized for a color balancing and/or reflectance balancing.

The diagnostic auxiliary label 322 comprises, in accordance with the strip-type arrangement of the test chemical 122, in this exemplary embodiment five diagnostic aids 118 in the form of test fields 116 which are arranged parallel to one another alongside one another perpendicularly to the running direction 514. In a subsequent cutting method, the carrier tape 112 produced in this way with the diagnostic auxiliary labels 322 applied thereon is cut along cutting lines 516 which run parallel to the running direction 514 and are only indicated in FIG. 5. Overall, in the present case, for example, six cutting lines 516 of this type are necessary, along which the carrier tape 112 with the auxiliary labels 322 applied thereon is cut into sub-tapes 518. Each of these five sub-tapes 518 which arise in this case in FIG. 5 forms an analysis tape 110, for example an analysis tape 110 in accordance with the illustration in FIG. 1. In this way, therefore, five analysis tapes 110 can be produced in parallel and simultaneously by means of the roll-to-roll method according to the invention.

Figure 6:
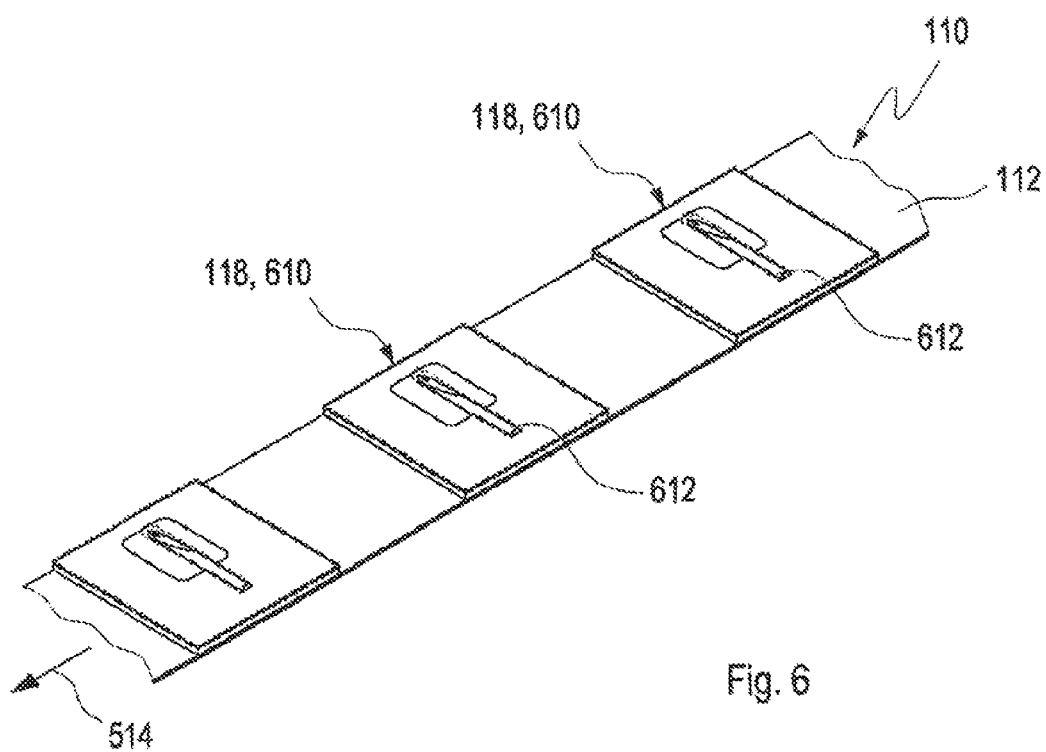
FIG. 6 shows an alternative exemplary embodiment to FIG. 1 of an analysis tape with diagnostic auxiliary elements with lancets.

The exemplary embodiments described above are examples in which the analysis tape 110 exclusively comprises diagnostic aids 118 in the form of test fields 116. However, other types of diagnostic aids 118 are also conceivable and can be used in the context of diagnostics and/or therapeutics in connection with an analysis tape 110. An exemplary embodiment of an alternative analysis tape 110 is illustrated in FIG. 6. This analysis tape 110 once again has a carrier tape 112, to which, in this exemplary embodiment, diagnostic aids 118 in the form of lancet packs 610 each comprising a lancet 612 are applied equidistantly. The lancet packs 610 are shown in an enlarged detail illustration in FIG. 7. The lancet packs 610, analogously to the diagnostic auxiliary labels 322 in the exemplary embodiments described above, can likewise be fixed in the form of labels on the carrier tape 112. On account of the flexible and flat lancet packs 610, this results in a rollable analysis tape 110 which can be inserted into a handheld device for automatic handling (for example analogously to the handheld device illustrated in FIG. 8).

Figure 7:
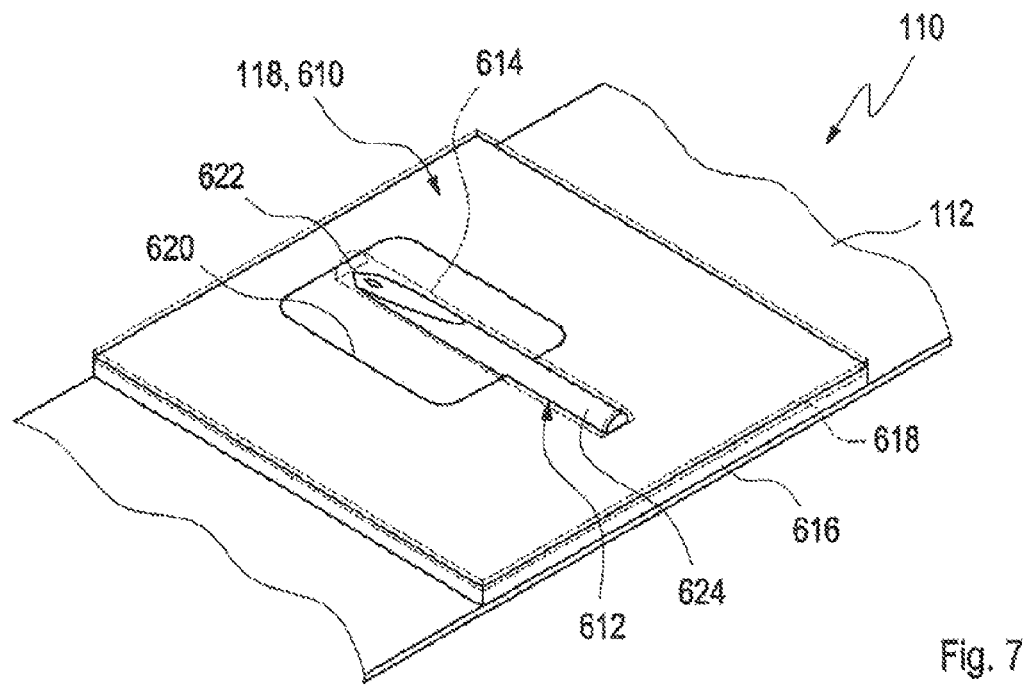
FIG. 7 shows a detail illustration of a diagnostic auxiliary element of the analysis tape in accordance with FIG. 6.

The enlarged view according to FIG. 7 reveals that the respective lancet 612 is protected in a pocket 614 formed by the lancet pack 610. The pocket 614 is formed by a film assembly comprising a base film 616 and a covering film 618. An extended pocket region 620 accommodates the lancet tip 622 in a manner lying freely, while a proximal shaft section 624 of the lancet 612 is tightly enclosed. Machine handling even with very small needle elements is thus facilitated, without having to fear damage to the very sensitive lancet tip 622 and impairment of the sterility thereof. A round lancet 612 oriented perpendicularly to the running direction 514 is provided in the embodiment shown. Other orientations and/or shapings are also conceivable, for example in the form of a flat puncturing element provided with a grooved capillary collecting channel.

Figure 8:
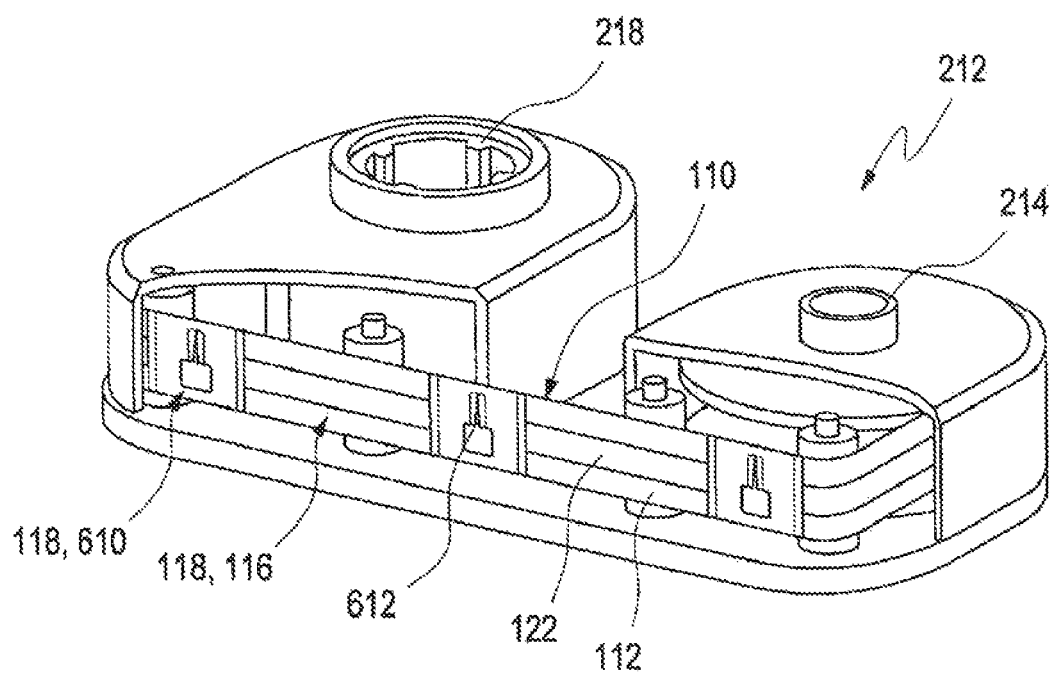
FIG. 8 shows an exemplary embodiment of a tape cassette for a diagnostic test tape on which diagnostic aids with test fields and diagnostic aids with lancets are applied in alternating fashion.

FIG. 8 illustrates an exemplary embodiment of a tape cassette 212 comprising an exemplary embodiment of an analysis tape 110, on which diagnostic aids 118 in the form of test fields 116 and lancet packets 610 are applied in alternating fashion. Each lancet pack 610 comprises a lancet 612, which can be configured as a flat lancet for example in this exemplary embodiment and which, in principle, can be configured similarly to the exemplary embodiment illustrated in FIGS. 6 and 7. Both the test fields 116 and the lancet packs 610 can be applied in the form of labels to a carrier tape 112 of the analysis tape.

The tape cassette 212 once again comprises a good winding 214 as a supply reel for unused tape material and a poor winding 218 as a take-up reel for remagazination or disposal of used diagnostic aids 118. The provision of diagnostic aids 118 can be effected by progressive tape advance, typically in a handheld device, in order to enable a largely automatic measurement sequence. A handheld device of this type can comprise for example an actuator for actuating the lancet 612 respectively situated in an application position, and an evaluation device for evaluating (for example optically evaluating) the measurement of the analyte concentration by means of the respective test field 116 situated in a measurement position. In the course of such a measurement, which can be performed actually by the patient on site, a thin covering film (reference numeral 618 in FIG. 7) is slit open by the lancet 612 and the lancet tip 622 is uncovered in the process. A puncturing movement for example for pricking a finger can then be carried out by means of a suitable actuator. In this case, the proximal shaft section 624 expediently remains connected to the film laminate, thereby simplifying the subsequent disposal of the lancet 612 on the carrier tape 112.

The abovementioned diagnostic aids 118 which can comprise test fields 116 and/or lancets 612 are only some of the many possible exemplary embodiments which can be used for medical diagnostics and/or therapeutics and for which the production method described below can be used. In addition, analysis tapes 110 can be used which can comprise other types of diagnostic aids 118 or combinations of such diagnostic aids 118.

Figure 9:
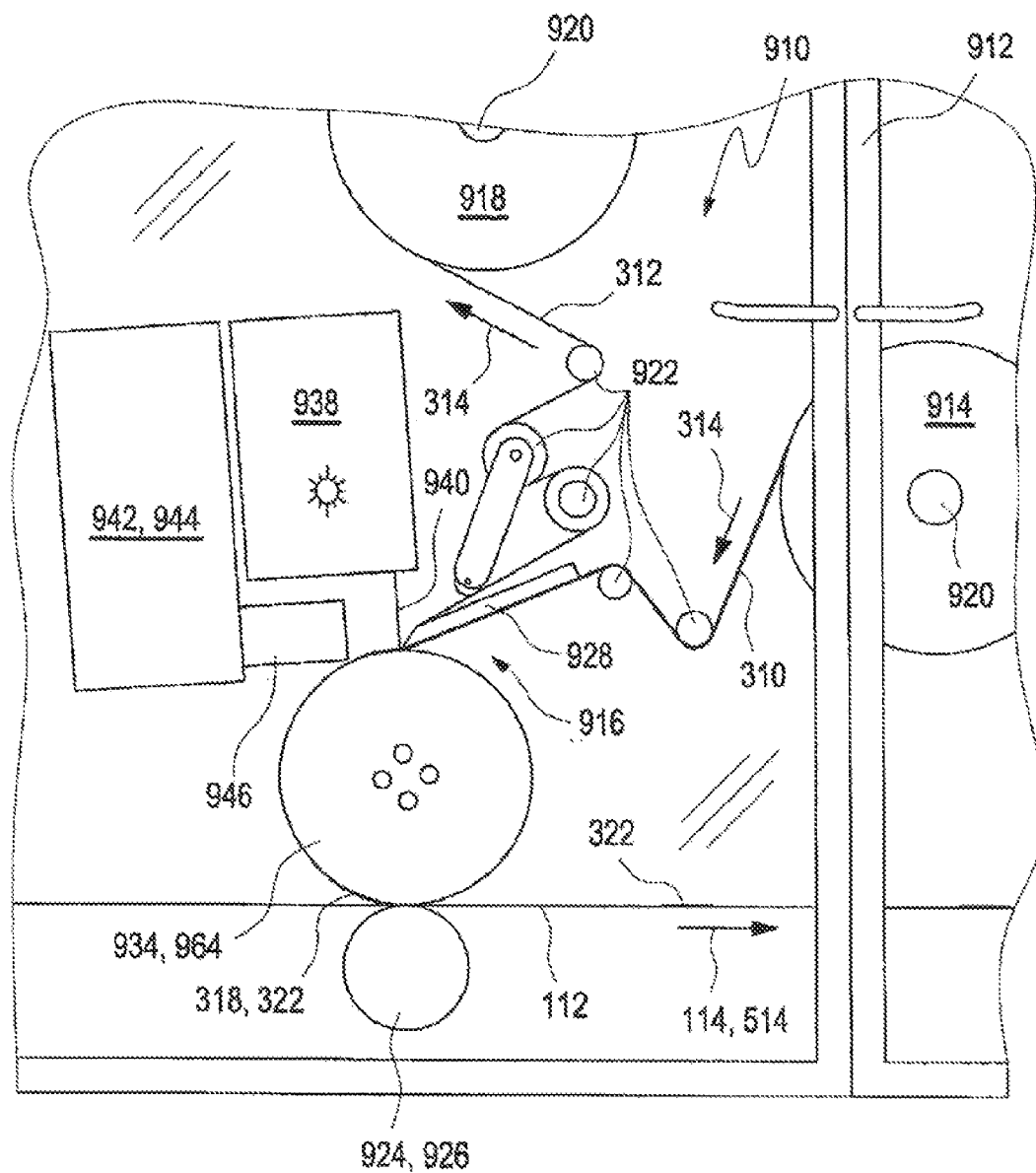
FIG. 9 shows an exemplary embodiment of a device according to the invention for producing an analytical test tape.
Figure 10:
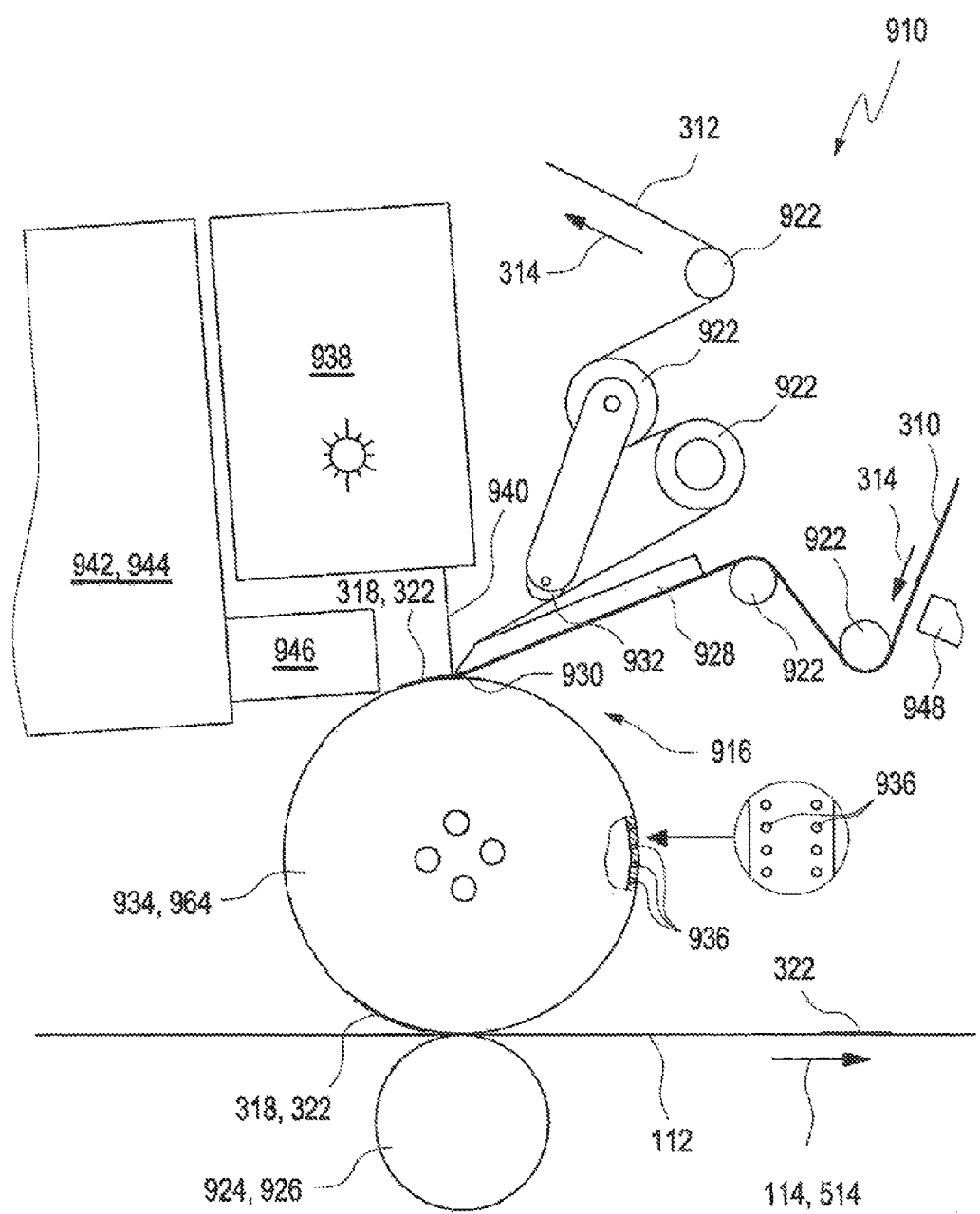
FIG. 10 shows a detail illustration of a labeling device of the exemplary embodiment in accordance with FIG. 9.

FIGS. 9 and 10 show a device 910 according to the invention for producing an analysis tape 110, for example an analysis tape 110 in accordance with one of the exemplary embodiments described above, in perspective illustration. The device 910 in one embodiment is accommodated in a housing 912, which can be discerned in FIG. 9 and which is equipped in particular with sheets tinted such that damage to the light sensitive test chemical 122 as a result of UV light can be avoided.

In the device 910, a roll-to roll method is used to apply diagnostic aids 118 (not discernible in the figures) to a carrier tape 112. It should be assumed hereinafter that the diagnostic aids 118 are aids with test fields 116, such that, with regard to the details of said diagnostic aids 118, reference may be made for example to the description of FIGS. 1, 3, 4 and 5. However, other types of diagnostic aids 118 can also be applied by means of the method.

In the method described, a laminate tape 310 is unwound from a laminate tape good winding 914 and fed to a labeling device 916, where, in accordance with the method described below, the diagnostic functional layer 318 is lifted off from the laminate carrier tape 312, and the used laminate carrier tape 312 is wound onto a laminate tape poor winding 918. The movement of the laminate tape 310 is designated by the reference number 314 in FIG. 9. This movement is brought about by laminate drives 920, which are merely indicated symbolically in FIG. 9. By way of example, a laminate drive 920 can be connected to the poor winding 918 and/or to the good winding 914 and/or to one or more deflection rolls 922 (which become transport rolls in this case). In the case of the drive of the transport rolls or deflection rolls 922, for example the laminate drive 920 can be arranged directly behind the driven deflection rolls 922. The carrier tape 112 is driven in its running direction 114, 514 by a carrier drive 924, which is likewise only indicated symbolically in FIG. 9. By way of example, an application roller 926 can be provided in the region of the labeling device 916, said application roller being driven by the carrier drive 924. As an alternative or in addition, however, the carrier drive can comprise at other locations drives which advance the carrier tape 112.

The labeling device 916 of the device 910 is shown in an enlarged detail illustration in FIG. 10. It can be discerned here that the laminate tape 310 is guided by means of deflection rollers 922 to a cutting edge 928. In this case, the laminate tape 310 is guided around a tip 930 of the cutting edge 928, said tip having a small radius. The tip 930 is also referred to as "dispensing edge". Afterward, the laminate tape 310 is guided along the top side of the cutting edge 928, where it is held by a press on roller 932, and, finally, is guided by means of further deflection rollers 922 as a poor product to the laminate tape poor winding 918 (not illustrated in FIG. 10). In this case, the poor product is now composed only of the laminate carrier tape 312, whereas the diagnostic functional layer 318 has already been dispensed during the process of winding onto the poor winding 218 occurs.

Furthermore, the labeling device 916 has a vacuum roller 934. The tip 930 of the cutting edge 928 is arranged directly above said vacuum roller 934. The vacuum roller 934 has suction openings 936 on its circumference. In this exemplary embodiment, the suction openings 936 are configured in round fashion and are distributed in two rows arranged in the circumferential direction with equidistant suction openings 936. However, other arrangements of the suction openings 936 are also possible, of course.

Furthermore, the device in FIGS. 9 and 10 has a cutting device 938. In this exemplary embodiment, said cutting device 938 is configured as a laser cutting device and comprises a CO2 laser that generates a laser beam 940. Said laser beam 940 is merely indicated symbolically in FIGS. 9 and 10 and is configured in such a way that it impinges on the diagnostic auxiliary labels 322 in the region of the tip of the cutting edges 930. The exact functioning will be explained in greater detail below with reference to FIG. 11.

Furthermore, the device 910 in accordance with FIGS. 9 and 10 in this exemplary embodiment has a withdrawal device 942, which is configured as an extraction device 944 using suction in this exemplary embodiment. This extraction device 944 using suction has an extraction connecting piece 946 using suction, the opening of which is arranged in direct proximity to the region in which the laser beam 940, the tip 930 of the cutting edge 928 and the surface of the vacuum rollers 934 meet. The extraction connecting piece 946 using suction is equipped with a cross section that suffices for sucking up the diagnostic functional layer 318.

A detection device 948 is indicated merely symbolically in FIG. 10, said detection device comprising an optical detection device, for example, and being designed to identify defect markings on the laminate tape 310 fed to the cutting edge 928. By way of example, said defect markings, as explained initially, can be color markings (for example defect marks printed on separately and/or discolorations brought about in a targeted manner in the test chemical 122) which can be detected for example by a camera and/or some other type of detection device 948. The detection device 948 can then be utilized for triggering the withdrawal device 942 for example directly or indirectly. In this way, sections of the diagnostic functional layer 318 that have been marked as defective and identified as such by the detection device 948 can be extracted by suction before they are labeled onto the carrier tape 112.

In order to produce defect markings, either a corresponding defect identification device and/or a defect marking device can be provided in the device 910 illustrated in FIGS. 9 and 10, or, as an alternative or in addition, the defect marking can also be effected in a separate production process for the laminate tape 310. Thus, by way of example, a laminate tape 310 comprising such defect markings can already be applied to the good winding 914. Thus, by way of example, a separate production device for the laminate tape 310 can have a defect identification device and/or a defect marking device for producing defect markings. By way of example, the laminate tapes can be monitored and marked optically during and/or after production. By way of example, the strips of test chemical 122 can be checked optically for correct color and/or form. Other types of defect checking are also possible.

Figure 11:
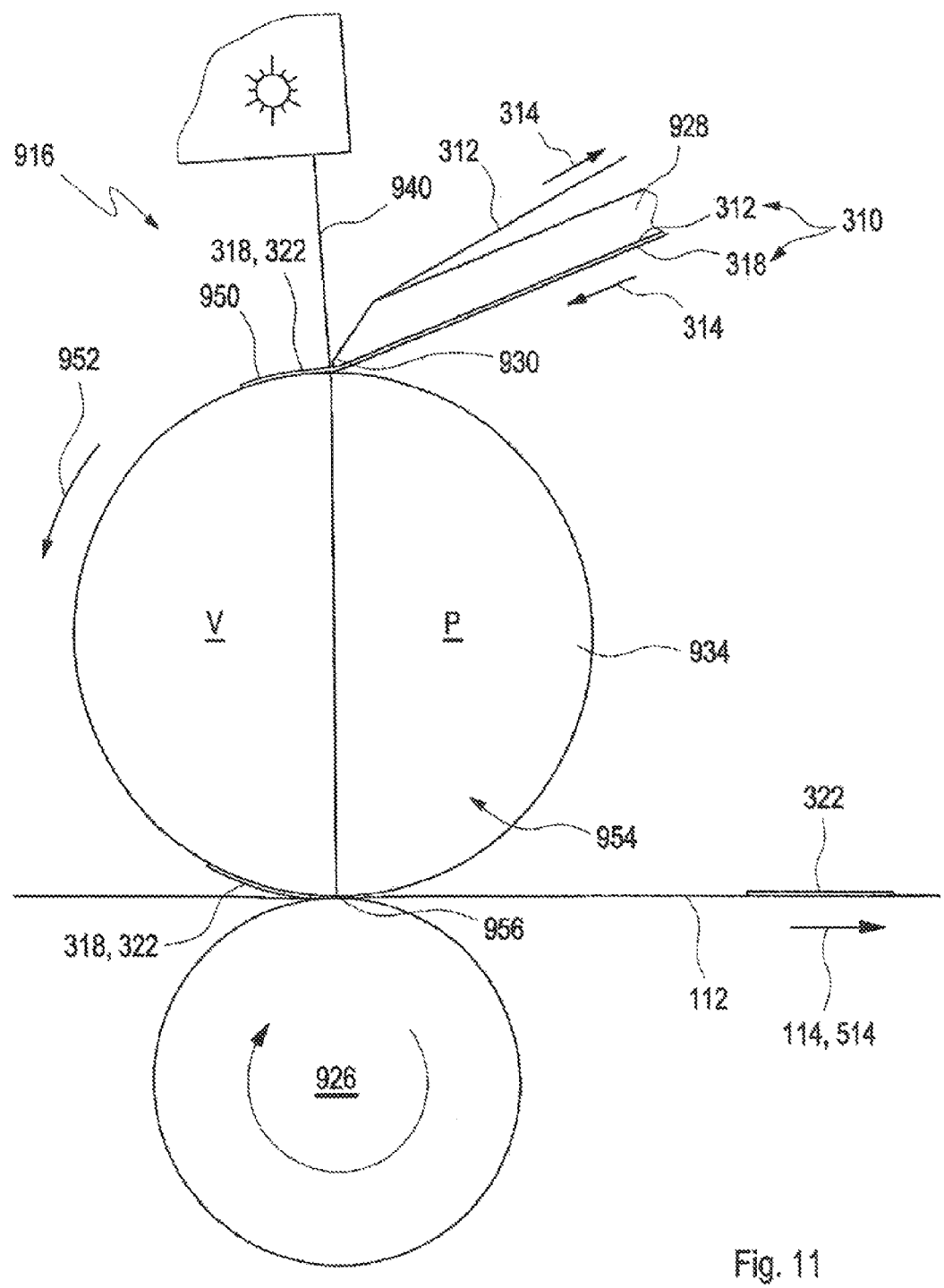
FIG. 11 shows a basic schematic diagram of the labeling device of the device in accordance with FIG. 10.

In order to explain in greater detail the functional principle of the device 910 illustrated in FIGS. 9 and 10, reference is made to the basic schematic diagram in FIG. 11. This basic schematic diagram only illustrates the labeling device 916, which comprises the cutting edge 928, the vacuum roller 934 and the application roller 926. Of the cutting device 938, which is likewise to be assigned to the labeling device 916, only the laser beam 940 is illustrated.

As can be discerned in FIG. 11, the laminate tape 310 is fed to the tip 930 of the cutting edge 928. As a result of the sharp deflection of the laminate tape 310 at said tip 930, a free end 950 of the diagnostic functional layer 318 is lifted off from the laminate carrier tape 312 and sucked up by the vacuum roller 934. As a result of the corresponding triggering of the cutting device 938, a cut is made at a precisely defined distance from said free end 950 of the diagnostic functional layer 318, such that a diagnostic auxiliary label 322 arises. This diagnostic functional label is conveyed toward the carrier tape 112 by means of a rotation 952 of the vacuum roller. In one embodiment, the drives of the carrier tape 112, of the laminate tape 310 and of the vacuum roller 934 are synchronized in such a way that precisely one diagnostic auxiliary label 322 is simultaneously applied on the surface of the vacuum roller 934.

The vacuum roller 934 has a pressure control device 954, which is illustrated symbolically by the designation "V" and "P" in FIG. 11. Said pressure control device 954 controls the pressure at the suction openings 936 and alternately applies reduced pressure and excess pressure thereto. In this case, the pressure control by the pressure control device 954 is configured in such a way that the diagnostic auxiliary labels 322, starting from application in the region of the tip 930 of the cutting edge 928, are sucked up and kept in this state until they reach a roller gap 956 between application roller 926 and vacuum roller 934, at which location the diagnostic auxiliary labels 322 are applied to the carrier tape 112. A pressure reversal is effected there by the pressure control device 954, and an excess pressure is applied to the suction openings 936 in order to release the diagnostic auxiliary labels 322.

Figure 13:
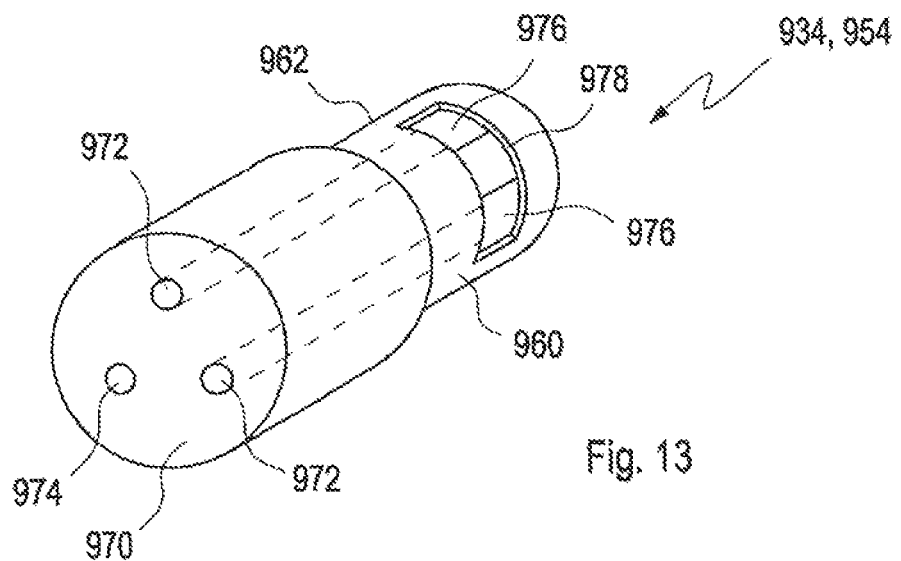
FIGS. 13 and 14 show different perspective illustrations of an exemplary embodiment of a pressure control device.
Figure 15:
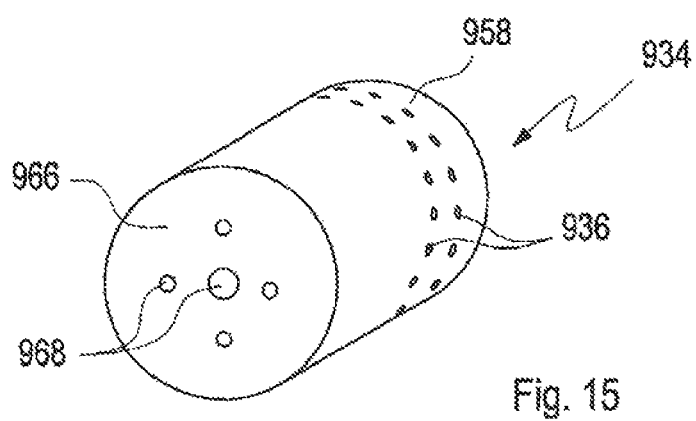
FIG. 15 shows a perspective illustration of an exemplary embodiment of an outer part of a vacuum roller.

Possible configurations of the vacuum roller 934 and of the pressure control device 954 can be gathered from the documents WO 99/03738 and U.S. Pat. No. 6,206,071 B1 already cited. FIGS. 13 15 illustrate a further exemplary embodiment of a vacuum roller 934, on the basis of which a possible functional principle of the pressure reversal will be explained.

Figure 14:
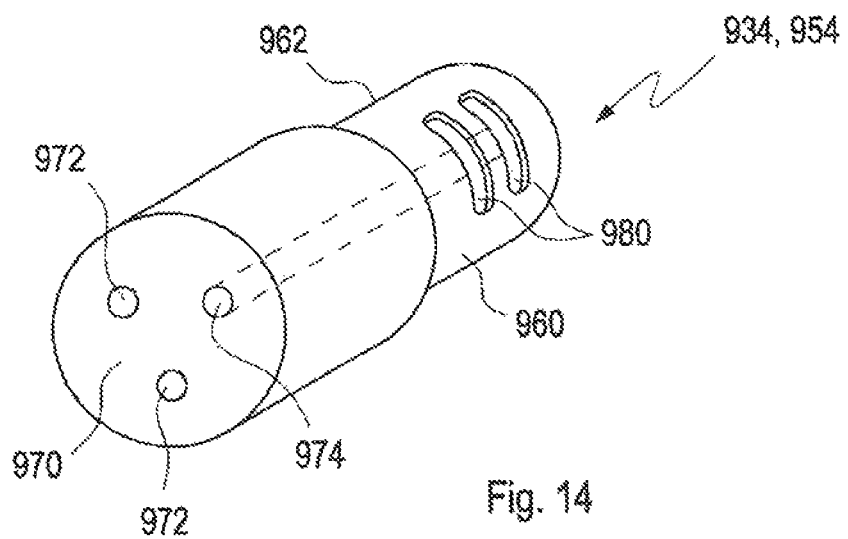

It can be seen from FIGS. 13 15 that the vacuum roller has two essential parts: in addition to the pressure control device 954 shown in different illustrations in FIGS. 13 and 14, it has an outer part 958. The pressure control device 954 comprises a stationary inner part 960, which does not concomitantly rotate in the device 910, but rather is arranged such that it is positionally and rotationally fixed. The inner part 960 is configured substantially in cylindrical fashion with a tapered portion 926, onto which the outer part 958 is pushed (from the right in FIGS. 13 and 14). The outer part 958 is likewise configured in cylindrical fashion, but is embodied as a hollow cylinder and has at its right end in FIG. 15 (not discernible in the illustration) an opening dimensioned in such a way that the latter fits together with an accurate fit with the outer circumference of the tapered portion 962 of the inner part 960. The outer part 958 is fixed to a driven shaft (not illustrated), such that it can be driven by means of a vacuum roller drive (designated symbolically by the reference numeral 964 in FIG. 9). The outer part 958 is closed at its end side 966, but has openings 968 serving for example for pressure relief during insertion of the inner part 960 and/or fixing of the driven shaft. FIG. 15 likewise reveals the suction openings 936, which, as already explained, are arranged in two rows running in the circumferential direction in this exemplary embodiment.

FIGS. 13 and 14 show the inner part 960 in different perspective illustrations. These illustrations differ from one another in that, in FIG. 14, the inner part 960 is rotated by 180° about its longitudinal axis in comparison with FIG. 13. In both cases it can be discerned that the inner part 960 has in this case three connection holes 972, 974 at its end side 970 remote from the tapered portion 962, said end side not being inserted into the outer part 958 in the assembled state. Of said connection holes, two connection holes 972 are configured as vacuum connection holes, whereas in this exemplary embodiment one connection hole 974 is designed as a compressed air connection hole. Accordingly, vacuum and compressed air are respectively applied to the connection holes 972, 974, for example by means of correspondingly flexible or rigid lines. Instead of compressed air, by way of example, simply a normal pressure could possibly also be applied (e.g. by simply opening the connection hole 974), or some other compressed gas could be applied, for example ultrapure air or an inert gas, such as argon or nitrogen, for example.

The vacuum connection holes 972 are connected to vacuum openings 976 arranged circumferentially in the region of the tapered portion 962. In this exemplary embodiment, two vacuum openings strung together in the circumferential direction are provided, which are respectively connected to one of the connection holes 972. The vacuum openings 976 are connected to a common depression 978, which is dimensioned in such a way that vacuum can be applied to the suction openings 936 in this region. The circumferential region over which the depression 978 extends thus determines the angular range or circumferential region within which vacuum is applied to the suction openings 936.

The compressed air connection hole 974 is connected to two compressed air openings 980, which can lie for example diametrically opposite the depression 978. In this exemplary embodiment, said compressed air openings 980 are embodied as circumferential slots which are in turn positioned in such a way that they are congruent in part with the suction openings 936. The circumferential extent of said slots of the compressed air openings 980 thus determines the angular range over which compressed air is applied to the suction openings 936.

The outer part 958 is caused to rotate by the vacuum roller drive 964. As a result of this, since the inner part 960 is stationary, different suction openings 936 successively pass over the depression 978 and the compressed air openings 980. When viewed in a positionally fixed fashion, vacuum application and compressed air application are always arranged in the same angular position regions, such that the diagnostic auxiliary labels 322 are sucked up and released always in the same angular position. Thus, by way of example, the depression 978 can substantially correspond to that region of the vacuum roller 934 which is designated by "V" in FIG. 11, whereas the circumferential region of the compressed air openings 980 can substantially correspond to the region designated by "P" in FIG. 11, in which case, naturally between these regions "V" of suction and "P" of pressure application, there may respectively be intermediate regions in which neither vacuum nor compressed air is applied to the suction openings 936. It goes without saying that other configurations of the vacuum openings 976, of the depression 978 and of the compressed air openings 980 are also conceivable.

Figure 12:
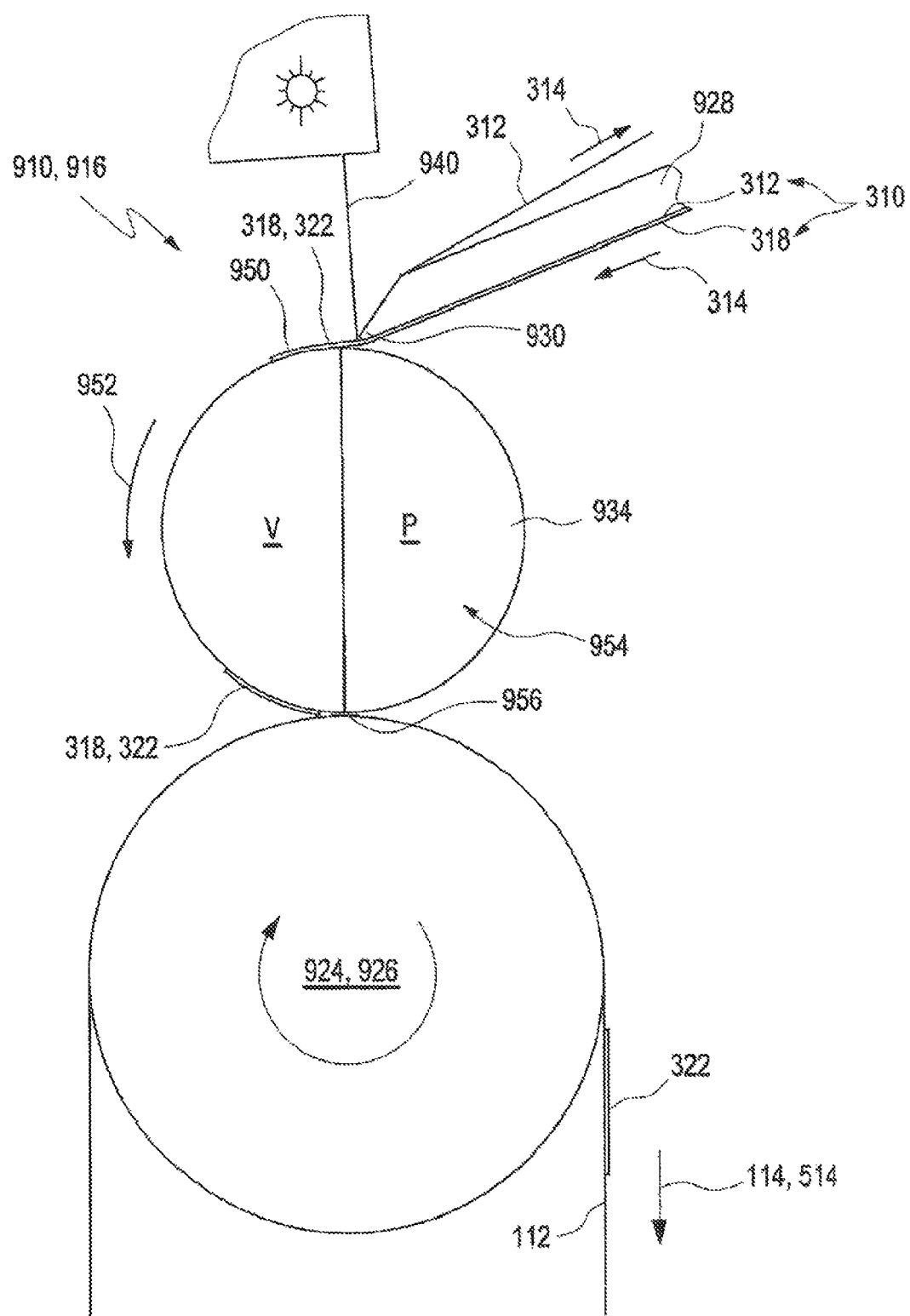
FIG. 12 shows a basic schematic diagram of an alternative exemplary embodiment of a labeling device.

Finally, FIG. 12 shows a device 910 (only once again the labeling device 916 thereof) in a detail illustration, this detail illustration corresponding to the basic schematic diagram in FIG. 11. This alternative embodiment substantially corresponds to the embodiment in accordance with FIG. 11, such that reference may largely be made to the description above. However, differences arise in the guidance of the carrier tape 112. While in FIG. 11 the application roller 926 has small dimensions (for example smaller than the vacuum roller 934) and while the carrier tape 112 is guided substantially without deflection by the roller gap 956, the application roller in the embodiment in accordance with FIG. 12 is designed as a deflection roller and is configured such that it is considerably larger than in FIG. 11, in particular considerably larger than the vacuum roller 934. In this exemplary embodiment, the carrier tape is deflected by almost 180° by the application roller 926, such that it comes into contact with the application roller 926 in a large circumferential region. Consequently, the application roller 926 can be utilized not only for generating a counterpressure with respect to the vacuum roller 934, but also for driving the carrier tape 112. For this purpose, the application roller 926 can be connected to a carrier drive 924 and thus be configured as a driven application roller. This configuration has the advantage that the drive of the carrier taper 112 is shifted to the direct vicinity of the application location of the diagnostic auxiliary labels 322 (which is arranged approximately in the roller gap 956). As a result, the precision of the application of the diagnostic auxiliary labels 322 can be considerably increased, whereby the passage speed of the carrier tape 112 can in turn be increased. In order to improve the adhesion of the carrier tape 112 on the application roller 926, the carrier tape can additionally be charged electrostatically, which further improves the precision of the carrier drive 924 and the guidance of the carrier tape 112.

The figures do not illustrate a further cutting device, which can optionally be provided for cutting up the carrier tape into sub tapes after the application of the diagnostic auxiliary labels 322. Furthermore, it should be pointed out that the device 910 illustrated in the figures, in one of the embodiments described, can be extended by additional devices. Thus, instead of the application of a single diagnostic auxiliary label 322 by a single labeling device 916, further labeling devices 916 can be provided, wherein for example different types of diagnostic auxiliary labels 322 with for example different types of diagnostic aids 118 can be applied. Thus, by way of example, it is possible to provide a labeling device 916 in which diagnostic auxiliary labels 322 with lancets 612 are applied, and a subsequent labeling device 916 in which diagnostic auxiliary labels 322 with test fields 116 are applied. Further elements can also be applied to the carrier tape 112, for example covering layers, markings or the like.

The features disclosed in the above description, the claims and the drawings may be important both individually and in any combination with one another for implementing the invention in its various embodiments.

It is noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present invention in detail and by reference to specific embodiments thereof, it will be apparent that modification and variations are possible without departing from the scope of the present invention defined in the appended claims. More specifically, although some aspects of the present invention are identified herein as preferred or particularly advantageous, it is contemplated that the present invention is not necessarily limited to these preferred aspects of the present invention.

What is claimed is:

1. A device for producing an analysis tape for fluid samples, the device comprising:
   a laminate drive configured to supply a laminate tape having a laminate carrier tape and at least one diagnostic functional layer;
   a cutting device configured to cut the diagnostic functional layer to form a diagnostic auxiliary label; and
   a labelling device including
   a cutting edge having a dispensing edge arranged adjacent the cutting device and configured to cause a free end of the diagnostic auxiliary label to lift off the laminate carrier tape,
   at least one vacuum roller configured to receive the diagnostic auxiliary label from the cutting edge, and
   a carrier drive configured to supply a carrier tape to the labelling device, the carrier drive and the vacuum roller are configured to interact so that the diagnostic auxiliary label is transferred from the vacuum roller to the carrier tape,
   wherein the diagnostic functional layer is cut at a predetermined distance downstream from the lifted off free end by the cutting device.

2. The device as claimed in claim 1 further comprising a vacuum roller drive for driving the vacuum roller, wherein the laminate drive, the carrier drive and the vacuum roller drive are synchronized.

3. The device as claimed in claim 1, wherein the cutting device comprises a CO2 laser.

4. The device as claimed in claim 1 further comprising a withdrawal device comprising an extraction device using suction, the withdrawal device configured to remove defective sections of the diagnostic functional layer before or after application to the vacuum roller.

5. The device as claimed in claim 1 further comprising a defect identification device for identifying defective incipient cuts of at least one of the diagnostic functional layer and the laminate tape.

6. The device as claimed in claim 1 further comprising a defect marking device for marking defective incipient cuts of at least one of the diagnostic functional layer and the laminate tape.

7. The device as claimed in claim 1 further comprising in a region of the labelling device, a detection device for identifying incipient cuts of at least one of the diagnostic functional layer and the laminate tape which have been marked as defective.

8. The device as claimed in claim 1, wherein at least one of the laminate carrier tape and the carrier tape is charged electrostatically.

9. The device as claimed in claim 1, wherein the diagnostic auxiliary label comprises at least one diagnostic aid selected from the group consisting of a diagnostic test field with a test chemical designed to detect one or more analytes in the fluid sample; and a lancet designed to perforate part of a patient's skin to generate a fluid sample.

10. The device as claimed in claim 1, wherein the at least one diagnostic auxiliary label is alternating lancets and diagnostic test fields.

11. The device as claimed in claim 2, wherein the cutting device is synchronized with the laminate drive, the carrier drive and the vacuum roller drive.

12. The device as claimed in claim 1, wherein the diagnostic functional layer includes defect markings for marking defective sections of the diagnostic functional layer, wherein sections marked as defective are removed before or after application to the vacuum roller.

* * * * *